United States Patent
Rui et al.

(10) Patent No.: US 7,755,890 B2
(45) Date of Patent: Jul. 13, 2010

(54) DEVICE FOR THE INTEGRATION OF A LAPTOP COMPUTER INTO AN AIRCRAFT

(75) Inventors: Fernandes Rui, Blagnac (FR); Denis David, Tournefeuille (FR); Dilmaghani Homayoun, Merenvielle (FR)

(73) Assignee: Airbus Operations (S.A.S.), Toulouse (FR)

( * ) Notice: Subject to any disclaimer, the term of this patent is extended or adjusted under 35 U.S.C. 154(b) by 271 days.

(21) Appl. No.: 11/877,240

(22) Filed: Oct. 23, 2007

(65) Prior Publication Data
US 2008/0154446 A1 Jun. 26, 2008

(30) Foreign Application Priority Data
Oct. 26, 2006 (FR) .................................... 06 54569

(51) Int. Cl.
*G06F 1/16* (2006.01)
*H05K 5/00* (2006.01)
*H05K 7/00* (2006.01)

(52) U.S. Cl. ............... 361/679.55; 348/837; 439/374

(58) Field of Classification Search ........... 361/679.02, 361/679.01, 679.55; 348/837; 439/374, 439/297
See application file for complete search history.

(56) References Cited

U.S. PATENT DOCUMENTS

| | | | | |
|---|---|---|---|---|
| 4,387,951 A | * | 6/1983 | Hall et al. ............... | 361/679.59 |
| 5,257,163 A | * | 10/1993 | Buist et al. ............. | 361/679.22 |
| 5,507,661 A | * | 4/1996 | Honda et al. ............ | 439/347 |
| 5,555,491 A | * | 9/1996 | Tao ........................ | 361/679.43 |
| 5,882,220 A | * | 3/1999 | Horii et al. .............. | 439/374 |
| 5,971,318 A | * | 10/1999 | Lustre ..................... | 701/16 |
| 5,973,917 A | * | 10/1999 | White ..................... | 224/275 |
| 5,991,838 A | * | 11/1999 | Swindler et al. ....... | 361/679.42 |
| 5,995,290 A | * | 11/1999 | Noble ..................... | 348/115 |
| 6,029,183 A | * | 2/2000 | Jenkins et al. .......... | 361/679.21 |
| 6,091,602 A | * | 7/2000 | Helot ...................... | 361/679.44 |
| 6,301,106 B1 | | 10/2001 | Helot et al. | |
| 6,381,133 B1 | * | 4/2002 | Chen ...................... | 361/679.33 |
| 6,400,561 B1 | * | 6/2002 | Horton ................... | 361/679.58 |
| 6,401,013 B1 | | 6/2002 | Mcelreath | |
| 6,490,154 B2 | * | 12/2002 | Thompson ............. | 361/679.41 |
| 6,522,535 B1 | | 2/2003 | Helot et al. | |
| 6,538,880 B1 | * | 3/2003 | Kamijo et al. ........... | 361/679.4 |
| 6,626,686 B1 | * | 9/2003 | D'Souza et al. .......... | 439/131 |
| 6,643,127 B1 | * | 11/2003 | Richardson .............. | 361/679.4 |
| 6,717,798 B2 | * | 4/2004 | Bell et al. ............... | 361/679.41 |
| 7,113,395 B2 | * | 9/2006 | Hara et al. .............. | 361/679.21 |
| 7,236,863 B2 | * | 6/2007 | LaPorte et al. .......... | 361/679.41 |
| 2001/0001319 A1 | * | 5/2001 | Beckert et al. ................. | 701/36 |

(Continued)

FOREIGN PATENT DOCUMENTS

GB 2405536 A 3/2005

*Primary Examiner*—Jayprakash N Gandhi
*Assistant Examiner*—Adrian S Wilson
(74) *Attorney, Agent, or Firm*—Perman & Green LLP

(57) ABSTRACT

The updating and consultation of flight documents, aeronautical maps and aircraft documentation is being facilitated by migration towards laptop-accessible electronic versions of these documents. To facilitate inflight exploitation of these documents, the laptop is connected to a docking station (105) itself connected to input (107)/output (106) peripherals accessible from flight decks. This docking station and these peripherals are mounted permanently in the cockpit. A laptop can then be introduced into the docking station so that the resources of this laptop can be exploited by the pilot or pilots during all the phases of a flight.

8 Claims, 2 Drawing Sheets

U.S. PATENT DOCUMENTS

| | | | |
|---|---|---|---|
| 2003/0122427 A1* | 7/2003 | Yearwood et al. | 307/10.1 |
| 2003/0198008 A1* | 10/2003 | Leapman et al. | 361/683 |
| 2004/0061995 A1* | 4/2004 | McMahon | 361/681 |
| 2005/0047081 A1* | 3/2005 | LaPorte et al. | 361/686 |
| 2005/0083650 A1* | 4/2005 | Yang | 361/687 |
| 2005/0161197 A1* | 7/2005 | Rapaich | 165/80.4 |
| 2006/0039105 A1* | 2/2006 | Smith et al. | 361/681 |
| 2008/0002350 A1* | 1/2008 | Farrugia | 361/681 |

* cited by examiner

DEVICE FOR THE INTEGRATION OF A LAPTOP COMPUTER INTO AN AIRCRAFT

BACKGROUND

1. Field

The disclosed embodiments are directed to a device for the integration of a laptop or portable computer into an aircraft cockpit.

The field of the disclosed embodiments is that of aviation and, more particularly, electronic flight bags or EFBs. Again more particularly, the field of the disclosed embodiments is that of class II EFBs.

2. Description of the Prior Art

A class II EFB is a portable electronic apparatus that is mounted in a position in which it is used in all the phases of flight and which requires administrative approval in order to be added to an aircraft or removed from it.

In aviation, especially commercial aviation, pilots need to have substantial documentation immediately available to them. This documentation comprises at least documentation on the aircraft known as the FCOM (Flight Crew Operating Manual) and documentation on the environment comprising aeronautical maps, airport maps and descriptions of procedures for different airports.

This documentation represents a substantial mass and a major volume. The consultation and use of this documentation on an aircraft in flight is not simple especially during what are called dynamic flight phases and during computations of performance. For it is difficult for a pilot to consult a large book placed on his knees or before him while at the same time having to pilot an aircraft in flight. This makes it necessary to close the book and hence lose one's place in it in order to be able to pay full attention to the flight controls.

Keeping this documentation up to date is also a painstaking task because it is very bulky and the paper format does not lend itself well to this type of operation, entailing much wastage of paper in which all the documents have to be replaced as soon as a technical updating is done.

To overcome these problems, pilots have begun to use laptops or portable computers to carry out different tasks and receive the documentation in question. These computers are used to store and consult this documentation. Laptops therefore replace the documents on the aircraft and the environment.

However, in the prior art there is no arrangement provided to receive a personal computer in an aircraft cockpit. A pilot must for example place the laptop on his knees or on a central shelf existing in certain aircraft. This inevitably raises certain problems, among them:

the laptop cannot be used during critical phases of flight when the pilot needs to rapidly access the piloting units such as the cross bar, or when the navigation instruments, for example the primary piloting screens, should not be concealed. These critical phases are, for example, landing and takeoff. It is also a source of problems to have a personal computer on one's knees during difficult flight conditions, for example when crossing zones of turbulence.

the computer is ergonomically subject to structural constraints and has a duration of use limited by its battery, and this is greatly insufficient for intercontinental flights.

To overcome these problems, solutions have been envisaged implementing class III EFB systems, i.e. systems that are totally integrated into the cockpit. Such systems are completely integrated into the aircraft and no longer have the flexibility of a laptop in terms of updating and maintenance. The smallest intervention in a class III ESB device of this kind therefore requires intervention by a team trained for this type of intervention in cockpits.

The disclosed embodiments resolve these problems by integrating a laptop through a class II EFB.

This integration is done through a reception docking station permanently installed in the aircraft cockpit. The term "permanent" is understood here to mean that the dismantling off the platform implies maintenance action involving the use of tools. The laptop is connected and attached non-permanently to this docking station. The laptop has information-processing capacity as well as programs and operational data. If the computer is not present, the system is inactive. In one variant of the disclosed embodiments, the connection to the docking station is done by means of an adapter between a connection system of the docking station and a connection system of the laptop. This makes it possible to take account of several models of laptops. The docking station is also connected to distant peripherals. These peripherals are a screen, keyboard and/or a pointing device such as a mouse. These peripherals are distant from the docking station so that they can be used by a pilot sifting in his pilot's seat. These peripherals are stored either permanently or not permanently.

SUMMARY

The disclosed embodiments are directed to a device for the integration of a laptop into an aircraft cockpit comprising the following elements distributed in the cockpit and interconnected:

a docking station to mechanically and electrically receive the laptop in the cockpit and connect the laptop to peripherals that are distant and connected to the docking station, the docking station being fixed to the aircraft, a screen-type distant output peripheral, readable by a pilot from his pilot's station, and distant input peripherals accessible to a pilot from his pilot's station.

In one variant, the device of the disclosed embodiments also comprises an adapter to connect the connecting system of a laptop model to the connection system of the docking station.

In one variant of the device of the disclosed embodiments, the input peripherals are in a central position relative to the pilot's station and are protected by a detachable shelf.

In one variant of the device of the disclosed embodiments, the output peripheral is fixed laterally relative to the pilot's station.

In one variant of the device of the disclosed embodiments, the input peripherals belong to the group formed by at least one of the following elements:

keyboard, pointing device.

In one particular variant, the keyboard is of the projected virtual keyboard type.

In one variant of the device of the disclosed embodiments, the distant input/output peripherals are connected to the internal power supply of the laptop to overcome the effects of a malfunction in a main power supply circuit.

In one variant of the device of the disclosed embodiments, the docking station comprises metal walls to ensure electromagnetic insulation for the laptop.

In one variant of the device of the disclosed embodiments, the means of fastening the laptop, docking station or adapter have a structure that enables the circulation of air to cool the personal computer.

In one variant of the device of the disclosed embodiments, the personal computer is fixed to the aircraft through an anti-vibration system.

BRIEF DESCRIPTION OF THE DRAWINGS

The disclosed embodiments will be understood more clearly from the following description and the accompanying figures. These figures are given by way of an indication and in no way restrict the scope of the disclosed embodiments. Of the figures.

MORE DETAILED DESCRIPTION

Figure 1:
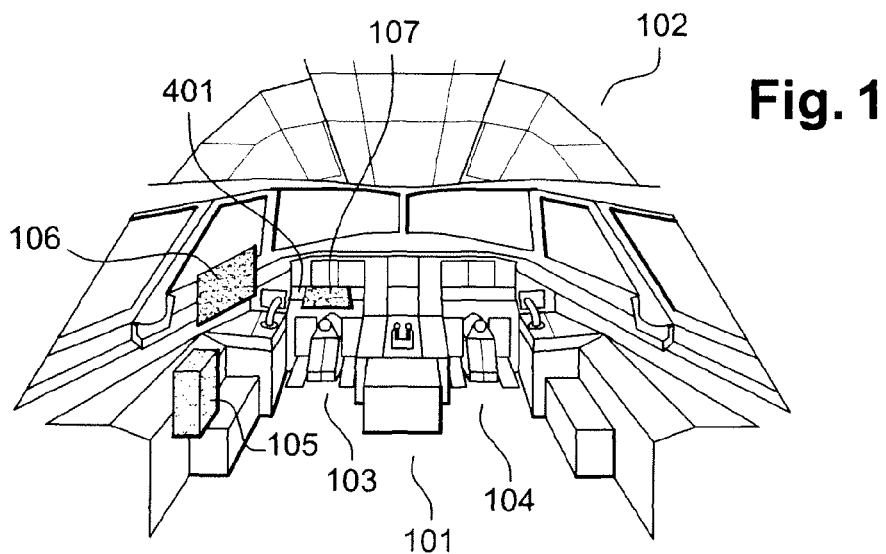
FIG. 1 illustrates a device according to the disclosed embodiments in position in an aircraft cockpit, it being possible to install at least one other device (not shown) symmetrically in the cockpit for purposes of system redundancy for a co-pilot.

FIG. 1 shows a cockpit 101 of an aircraft 102. The term "cockpit" herein designates the pilot's cabin, namely the compartment of the aircraft from which the pilots operate to command the aircraft. FIG. 1 does not show the pilot's seats so as to better highlight the different elements of the device of the disclosed embodiments. FIG. 1 shows two pilot's stations 103 and 104. These pilot's stations are symmetrical relative to each other in a vertical plane dividing the aircraft into two lengthwise.

FIG. 1 shows a compartment 105 which is actually a docking station capable of receiving the laptop. This compartment is fixed laterally between the entry to the pilot's cabin and the pilot's seat. In practice, this compartment replaces the housing originally used to stow the flight documents replaced by the laptop.

FIG. 1 also shows a screen 106 fixed to the aircraft at the height of the pilot's face when he is seated in the pilot's seat so that it can be easily consulted. Ideally, the screen is therefore fixed laterally and under the front side window. In this position, the pilot enjoys good visual comfort and, above all, this side location is the preferred location in which the pilots place their paper documents. In one variant of the disclosed embodiments, the screen 106 is fixed to an arm that is mobile but can be locked in a position to be chosen by the user, the mobile arm itself being fixed to the aircraft 102.

FIG. 1 also shows input peripherals 107. These input peripherals comprise at least keys, in a preferred example a complete standard keyboard (AZERTY or QWERTY 102-key keyboard). In one variant, the keyboard is a projected virtual keyboard. The input peripherals also comprise control keys of the laptop, for example On/Off keys, standby, etc. In one variant, these peripherals also have a pointing device such as a mouse, touchpad or trackball. In a preferred variant, these peripherals are therefore equivalent to those of the laptop. These input peripherals are located so as to be facing the pilot when he is in his pilot's station. These peripherals are situated and fixed on a worktop. This worktop is preferably hollow and the input peripherals are situated in the hollow which can be closed by a sliding pivoting cover. When the cover is closed, the pilot therefore has a shelf on which he can place all sorts of objects and perform all sorts of jobs. When the cover is open, the pilot can access the input peripherals.

Figure 4:
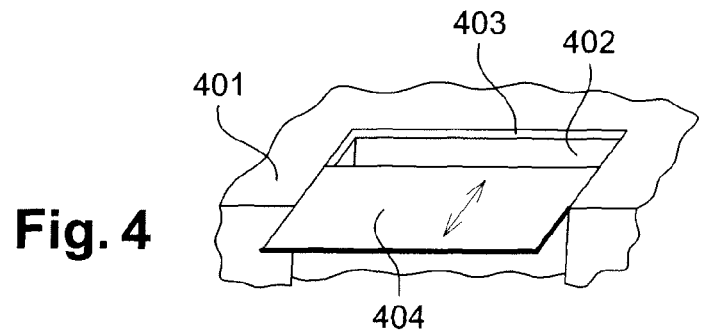
FIG. 4 illustrates the arrangement of the input peripherals.

FIG. 4 illustrates a worktop of this kind. FIG. 4 shows an onboard table 401 in which a hole 402 is made. The upper rim of this hole has a rail 403 in which, parallel to the plane of the table 401, there is a sliding panel 404. The movements of this plate 404 serve to open and close the hole 402 in which the peripherals 107 are stowed. In one variant, the opening of the hole 402 by means of a tensile force on the panel 404 causes the bottom of the hole 402 to rise, making the peripherals 107 more accessible.

In one variant of the disclosed embodiments, the input peripherals 107 are not fixed to the aircraft but only interposed in the cavity 402. This cavity then has local connectors attached to the connector 204. These local connectors are used to connect a keyboard and/or a pointing device. This variant makes it possible to pass quite simply from one type of keyboard and/or pointing device to another, according to the pilot's habits. It is then possible to pass simply from an AZERTY keyboard to a QWERTY keyboard, or from a trackball to a touchpad. The fact that the hole 402 has a cover ensures that, when this cover is closed, the input peripherals are no longer liable to be ejected from the orifice and thus cause inconvenience to the pilots.

The docking station 105 is connected to the screen 106 and to the peripherals 107 via cables integrated into the cockpit and its cladding. In one variant of the disclosed embodiments, this remote connection is made through wireless connections, either WiFi or Bluetooth connections for example.

Figure 2:
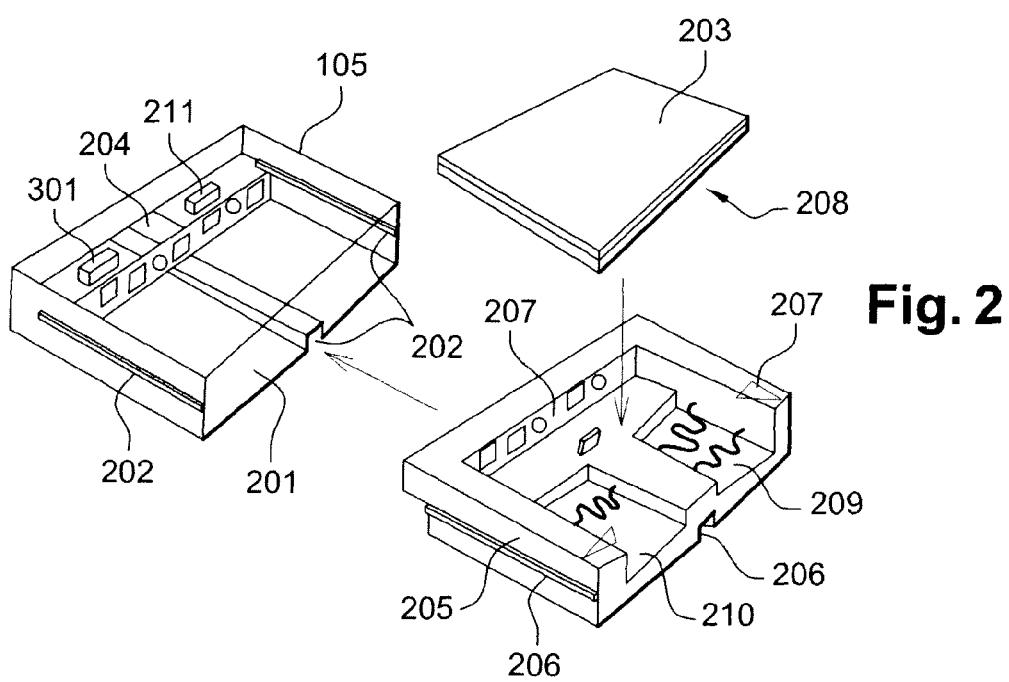
FIG. 2 illustrates a docking station for an adapter and a laptop.

FIG. 2 shows the docking station 105. This docking station has at least one metal frame forming a casing capable of containing a laptop in its entirety. The docking station 105 is therefore a rectangular box open on its upper part 201. The docking station 105 is fixed to the cockpit by one of its side faces having the most extensive surface area.

On at least one of its internal side walls, the docking station 105 has at least one rail and/or guiding feature 202 to guide a laptop 203 when it is inserted into the docking station 105. These rails and/or guiding features are used to guide the computer 203 to a connector 204 situated at the back of the docking station 105. The connector 204 brings together the entire connection system as well as the mechanical links used to receive a personal computer. It is through the connector 204 that the docking station 105 interconnects the computer with the remote peripherals, namely the screen 106 and the input peripherals 107. These peripherals are said to be distant because they enable the use of the system resources of the laptop without being within physical or even visual range of the laptop. This is therefore not a simple docking station but one that enables the shifting of the system resources of a laptop in an aircraft.

In this context, a rail is a longitudinal protruding feature or hollow extending in the direction of the insertion and withdrawal of the computer into and from the reception docking station. A rail with a protruding shape co-operates with a hollow rail The docking station 105 is made out of a metal material used to provide an electromagnetic shielding to the laptop 203 inserted in the docking station 105. This shielding ensures that the computer 203 is harmless relative to the equipment of the aircraft 102 and vice versa. This shielding therefore also enables the use of any type of laptop whatsoever, even models that have not been certified for aeronautical use. This shielding also ensures that an electromagnetic malfunction in a model certified for aeronautical use will have no effect on the navigation instruments of the aircraft 102. In one variant of the disclosed embodiments, this shielding is complemented by a detachable metal cover for the casing 105.

In one variant, the docking station has a mechanical lock-type latching system enabling the use of this docking station as a strong box in which the pilot can secure objects during halts at airports.

FIG. 2 also shows an adapter 205 capable of electrically and mechanically receiving the portable computer or laptop 203. The adapter 205 is also capable of being connected to the connector 204 of the docking station 105. In practice, there is one model of adapter 205 per model of laptop computer. More specifically, there is one model of adapter 205 per type of laptop connection interface. The use of such an adapter 205 enables inter alia the standardizing of the reception block 105. This standardization then relates to its dimensions and its connector 204. To this end, the adapter 205 has a connector 207 providing for the mechanical and electrical interfaces between the laptop 203 and the connector 204.

The adapter 205 has rail and/or guiding features complementary to the rails and/or guiding features 202, the elements 205 cooperating with the elements 202 to guide the adapter 205 in the docking station 105 during the insertion of the adapter 204 into the docking station 105.

In one embodiment, the adapter 205 covers the computer 203 on at least four of its six faces. If a laptop placed normally and in a closed position on a table is considered then, in one embodiment the adapter 205 leaves the upper face and the front edge of the computer 203 visible. On at least one of its lateral edges, on the upper part of this edge, the adapter 205 has a means 210 for locking the computer 203 into the adapter 205. The means 210 are, for example, a latch 210 pivoting in a plane parallel to the plane in which the computer 203 extends. In an open position, the latch 210 enables the insertion of the adapter 205 into the computer 203 and its removal from the computer 203. In a closed position, the latch 210 prevents the removal of the computer 203 from the adapter 205.

Inside the adapter 205, on the wall of the adapter facing the lower face 208 of the computer 203, the adapter has at least one guiding feature 209 enabling ventilation means of the computer 203 to fulfill their role. The guiding feature 209 therefore enables the flow of air ventilated by the computer 203. To this end, the guiding feature 209 opens at least on to the face of the adapter 205 opposite the connector 207.

In one variant of the disclosed embodiments, the link between the docking station 105 and the adapter 205 is elastic. This elasticity dampens the vibrations produced by the aircraft 102 in certain phases of flight. This ensures the availability of the computer 203 during the dynamic phases of flight such as landing and takeoff. This also ensures the availability of the computer 203 in the event of inflight malfunctioning resulting in a continuously vibrating environment.

This elasticity is obtained, for example, by the making of the adapter 205, or of the external part of the adapter 205, with vibration-absorbent elastic material.

The description has focused on a system for the connection of a laptop. In practice, this system may be duplicated. In this case, that is one system of this kind for the pilot and one system for the co-pilot. These systems are then physically symmetrical relative to the above-defined plane of symmetry. These two systems may then be interconnected as shall be described further below.

Figure 3:
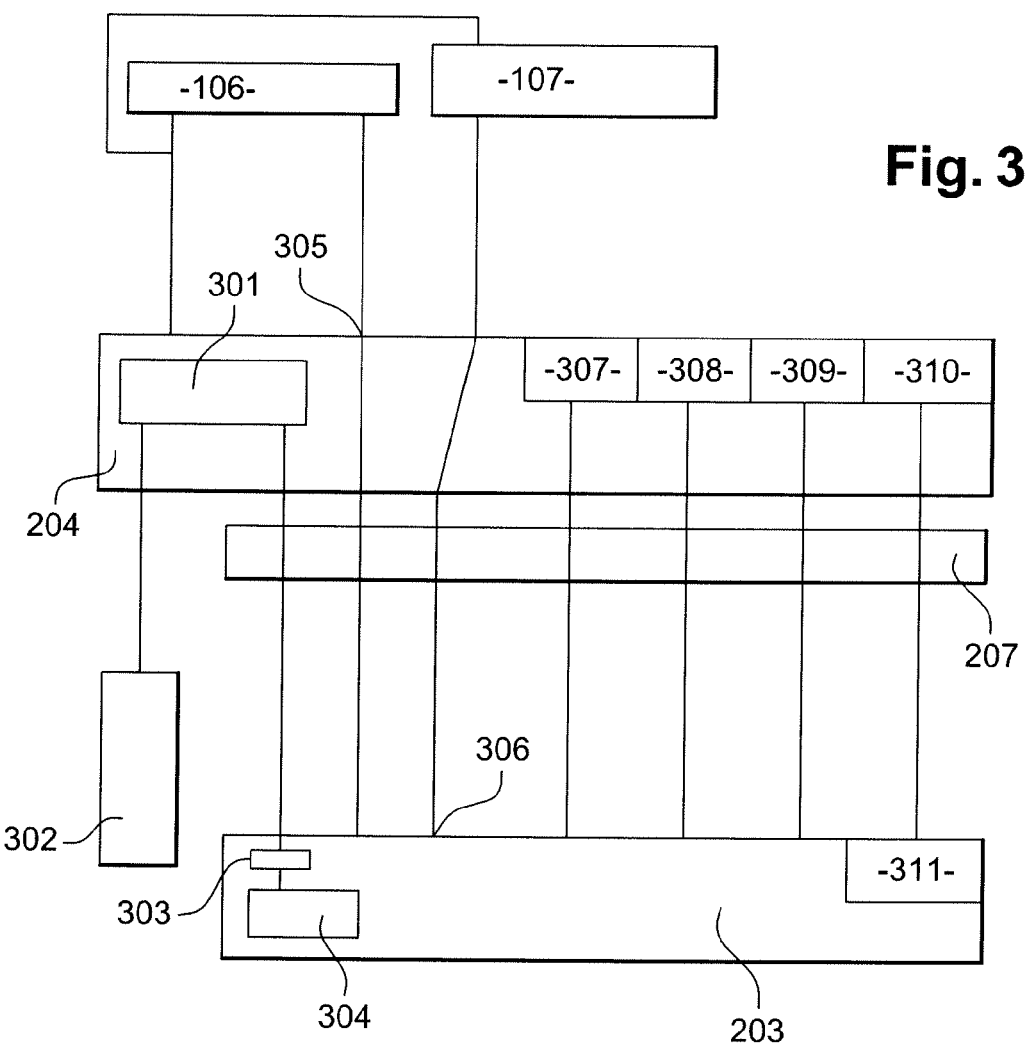
FIG. 3 is a diagram of the connections made by the device according to the disclosed embodiments.

FIG. 3 is a schematic figure of the electrical interactions that exist between the different elements of the system according to the disclosed embodiments. For identical elements, the figures repeat identical numbers in this context.

FIG. 3 shows the connector 204 and its different elements. FIG. 4 especially shows that the connector 204 has an element 301 which is an electrical management module. The module 301 is connected to the general electrical power supply 302 of the aircraft 102. The module 301 is also connected to the screen 106 and to the distant peripherals 107. Finally, the module 301 is also connected, through the adapter 205 to a module 303 for the electrical management of the computer 203. The module 302 has the conventional function of providing the power supply of the components of the computer 203 and the management of a battery 304 of the computer 203.

In normal operation, the screen 106, the peripherals 107 and the computer 203 are powered by the general power supply 302. In the event of malfunctioning of the general power supply 302 following a malfunction of the aircraft generation or distribution systems, the module 301 powers the elements 106, 107 and 203 by means of the battery 304. This prevents overloading an electrical standby device of the aircraft. In the case of such malfunctioning, the module 301 performs the following operations:

it isolates the computer 203, the screen 106 and the peripherals 107 from the rest of the electrical circuit of the aircraft, it powers the computer 203, the screen 106 and the peripherals 107 from the battery of the computer 203. The autonomy of the computer 203 therefore ensures the availability of the electronic documentation up to the end of the flight.

In one variant of the disclosed embodiments, in the event of a more serious malfunction affecting the standby power supply of the aircraft, the module 301 diverts the power supply of the battery 304 toward the navigation systems essential for the piloting of the aircraft 102.

FIG. 3 shows that the screen 106 is connected through a first video output 305 corresponding to a first video output of the computer 203, the one designed to be connected to an external monitor.

In one variant of the disclosed embodiments, a video input of the laptop computer is connected, via the docking station, to a video selector switch enabling the selection of the video signals from among those produced by a device in the group formed by the following: the EFB system of the other pilot, a video surveillance system. This video selector switch is then either installed on the platform or fixed to a wall of the cockpit.

FIG. 3 also shows that the connector 204 takes up all the essential peripheral connectors of the computer 203. These connectors of the computer 203 are accessible on the exterior of the docking station 105 via the connectors 204 and 207.

The docking station 105 proposes a USB connector 307 which, for example, enables information exchanges by means of a USB format memory stick. This function may enable the pilot and co-pilot to exchange files during the journey while their respective computers remain in the docking stations.

Depending on the laptop models, the docking station 105 also proposes a second video input type video connector 308. This second connector enables the personal computer to be provided with a digital video image which may be displayed on the screen. This device enables for example the pilot to display the video images generated by the co-pilot's personal computer for purposes of verification. The connector 308 is duplicated so as to have one video input and one video output so that the exchanges of video images and/or the verifications can be cross-checked. In this variant, the interconnections between the second video outputs are made through a cabling integrated into the apparatus. This averts the need for cables on the floor of the pilot's cabin.

The docking station 105 also proposes an Ethernet connector 309. This connector enables the personal computer to access other systems installed on board the aircraft, such as systems managing Internet communications, for example IP telephony. This connector also enables the interconnection, through the aircraft network, of several personal computers, that of the pilot and of the co-pilot for example. In this variant, and optionally, the connector 204 has a concentrator 211 with three ports, one to connect the computer 203 to the network of the aircraft and one to provide an external connection for a third apparatus.

Figure 5:
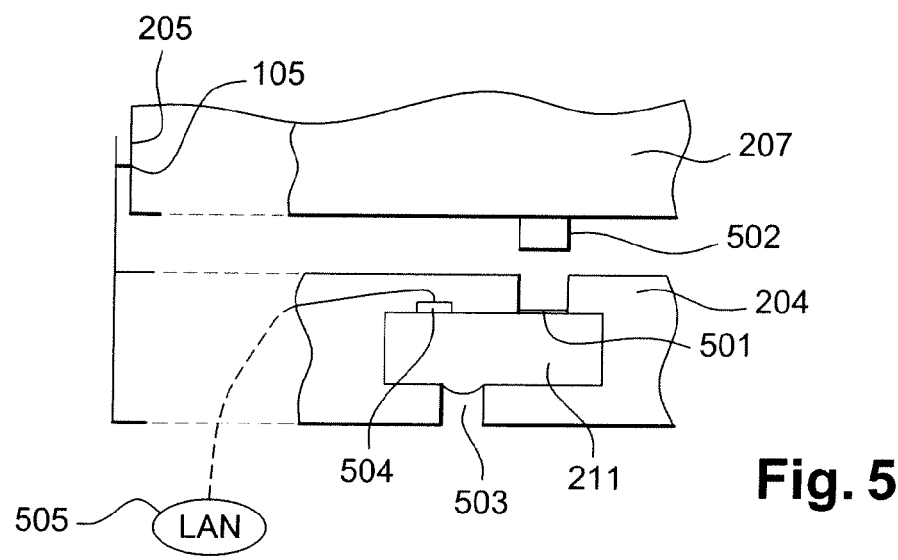
FIG. 5 illustrates an interconnection between an adapter and a docking station.

FIG. 5 illustrates a concentrator 211 of this kind. The concentrator is therefore included and fixed in the connector 204. The concentrator 211 has a first input 501 situated inside the docking station 105 and capable of co-operating with a connector 502 of the connector 207. The link formed by the connectors 501 and 502 enables the connection of the computer 203 to the concentrator 211. The concentrator 211 also has an input 503 situated on the interior of the docking station 105 therefore enabling the connection to the concentrator 211 to any unspecified network peripheral. The concentrator 211 also has a connector 504 connected to the local area network (505) or LAN of the aircraft. The computer 203 is therefore connected in this way to the network 505 and another peripheral can be connected to this network. A concentrator has been described here but it is also possible to use a network switch in the same function.

FIG. 5 illustrates the way in which an interface can be set up between a connector C1 (502) of the connector 207 and a connector C2 (501) of the connector 204 so that the connector C1 becomes accessible from a connector C3 of the connector 204. The connector C2 is inside the docking station 105, the connector C3 being outside. The principle therefore is that of connecting the connectors C2 and C3 directly through a cable or through a device of the concentrator or converter type, enabling the functions of the connector C2 to be extended. This is the same principle that is used to connect the connectors of the computer 203 to the connector 207.

The docking station 105 also proposes an "ARINC 429" type connector 310 which is accessible if the computer 203 is equipped with an "ARINC 429" board 311. This connector enables a connection to the maintenance bus of the aircraft and therefore to the aircraft avionics. This enables access to avionic data such as aircraft position, aircraft mass and remaining fuel mass. This data can be used by computer applications implemented by the personal computer:

the position of the aircraft: this data is used to present the different aeronautical maps in an oriented and centered manner;

aircraft and fuel mass: this data enables automatic verification of the computations of performance made by the pilot or co-pilot (landing distance, fuel available at destination etc).

The EFB system of the disclosed embodiments therefore serves to augment the pilots' knowledge of the situation of the aircraft and therefore improves working and information-searching procedures.

In one variant of the disclosed embodiments, the connector 204 has an electronic interface enabling the ARINC bus to be locally interfaced with an Ethernet connector. The computer can then access avionics data through a local area network created by the connector 204. This interface to the ARINC bus can also have a USB support on the computer 203 side. In this case, as in the case of the board 311, ad hoc drivers have to be installed in the computer 203 so that it can fully interface with the aircraft to which it is connected.

The system of the disclosed embodiments therefore enables the crew of an aircraft to be provided with a system of documentation and electronic tools that performs well and is reliable because it is redundant. This system is furthermore easy to adopt because it does not hinder the usual practices of the crews owing to its strategic position in the cabin. It is therefore easily readable and, at the same time, usable because it can also be ignored through its lateral position and because the input peripherals can be masked by a shelf. Furthermore, this position actually corresponds to the position of the elements replaced by the system of the disclosed embodiments.

The system of the disclosed embodiments therefore is a system that is efficient and, at the same time, does not disturb the main piloting tasks.

In practice, the connector 204 is modular, i.e. options can be added to it such as other connection interfaces, for example an IEEE 1394 port or an additional cooling device such as an additional ventilator. The device of the disclosed embodiments is therefore adaptable through connectors 204 and 207.

What is claimed is:

1. A device for the integration of a portable computer into an aircraft cockpit, the cockpit having a pilot's station with frontal access to aircraft control electronics said integration device comprising:

a docking station adapted to removably receive the portable computer and provide mechanical and electrical connections, the docking station fixed in the cockpit in a non-interfering position relative to the aircraft control electronics;

a display screen remotely connected to the docking station for dedicated presentation of graphics and data in association with the portable computer, the display screen being fixed laterally relative to the pilot's station and readable by a pilot from the pilot's station without obstructing the visibility or use of the aircraft control electronics;

at least one user input peripheral mounted in an enclosure accessible to a pilot from his pilot's station, said at least one user input peripheral being connected to the docking station for operation in association with the portable computer; wherein the docking station connects the portable computer with the display screen and the at least one user input peripheral to provide a separate computer system for processing supplemental flight crew documentation stored in the portable computer; and wherein the integration device further comprises an adapter constructed as an interface to receive, support, and electrically connect a predetermined model of a portable computer to the connection system of the docking station, wherein the adapter is mechanically and electrically engaged in the docking station and is supported within the docking station by vibration absorbing elastic material, the adapter is further supported in the docking station by a guiding feature that enables the flow of air ventilated by the portable computer.

2. The integration device according to claim 1, wherein the at least one user input peripheral is enclosed on a shelf constructed in a central position relative to the pilot's station and is protected by a lid which may be opened and closed to provide access and protection to and for the at least one user input peripheral.

3. The integration device according to claim 1, wherein the at least one user input peripheral comprise a keyboard and/or a pointing device.

4. The integration device according to claim 1, wherein the remote display and user input peripherals are connected to the internal power supply of the portable computer through the docking station to avoid the effects of a malfunction in a main power supply circuit of the aircraft electronics.

5. The integration device according to claim 1, wherein the docking station comprises metal walls to ensure electromagnetic insulation for the portable computer.

6. The integration device according to the claim 1, wherein the portable computer is attached to the docking station by a fastener that is constructed to enable the circulation of air for the cooling of the portable computer.

7. The integration device according to claim 1, wherein the docking station is constructed to support the portable computer through an anti-vibration system.

8. An airplane constructed having the portable computer integration device of claim 1.

* * * * *